United States Patent Office 3,796,668
Patented Mar. 12, 1974

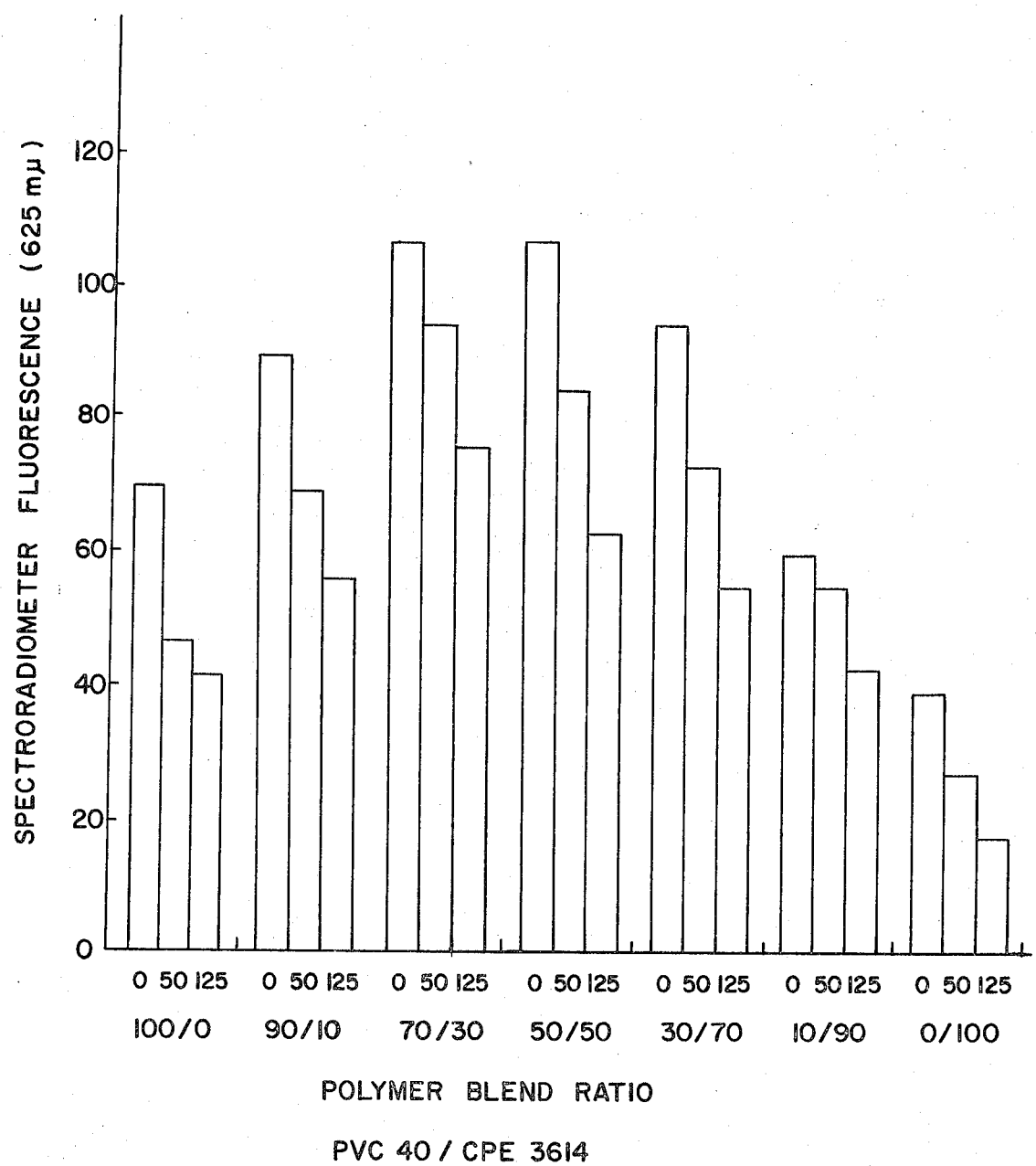
FIG_1

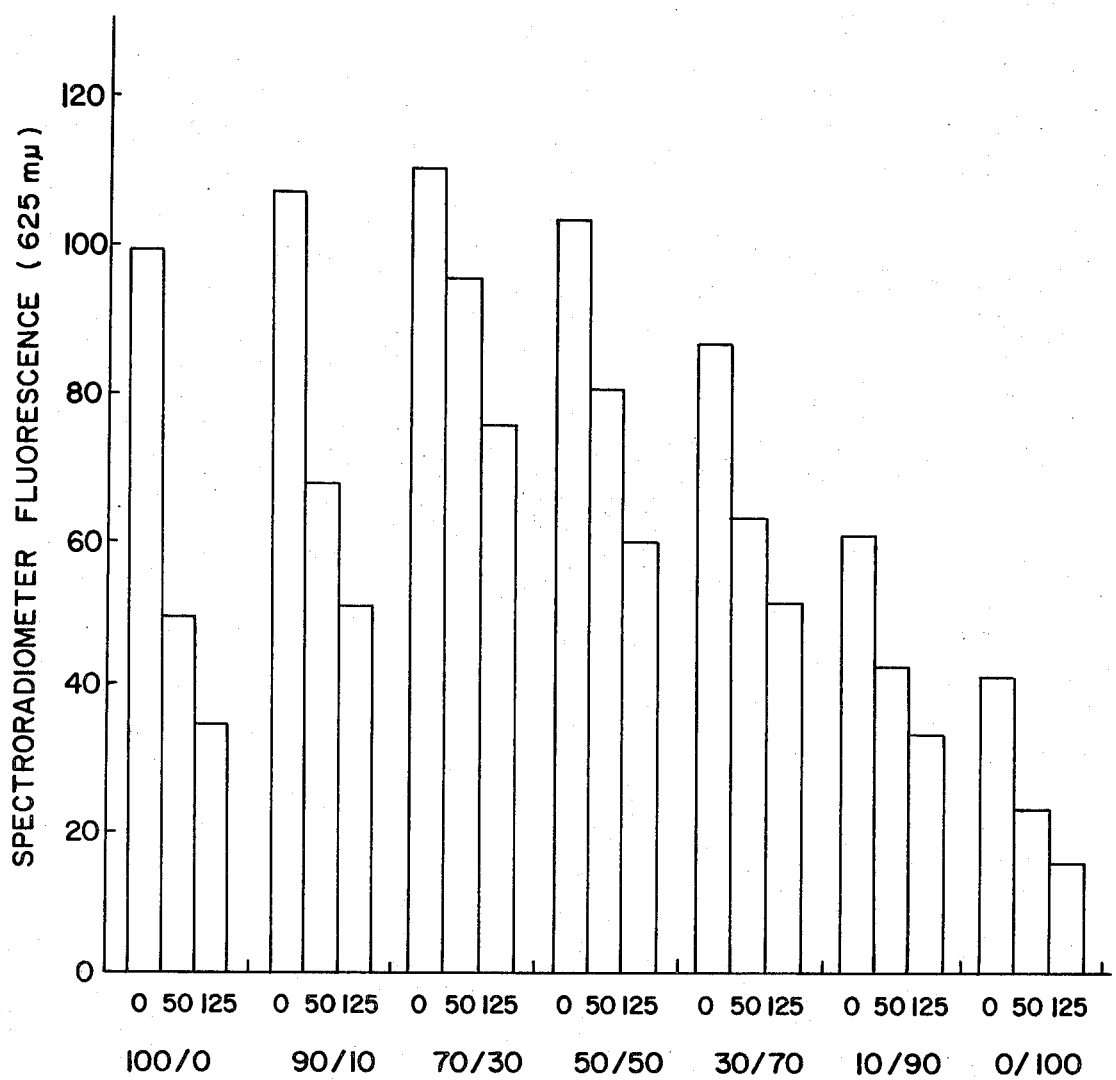

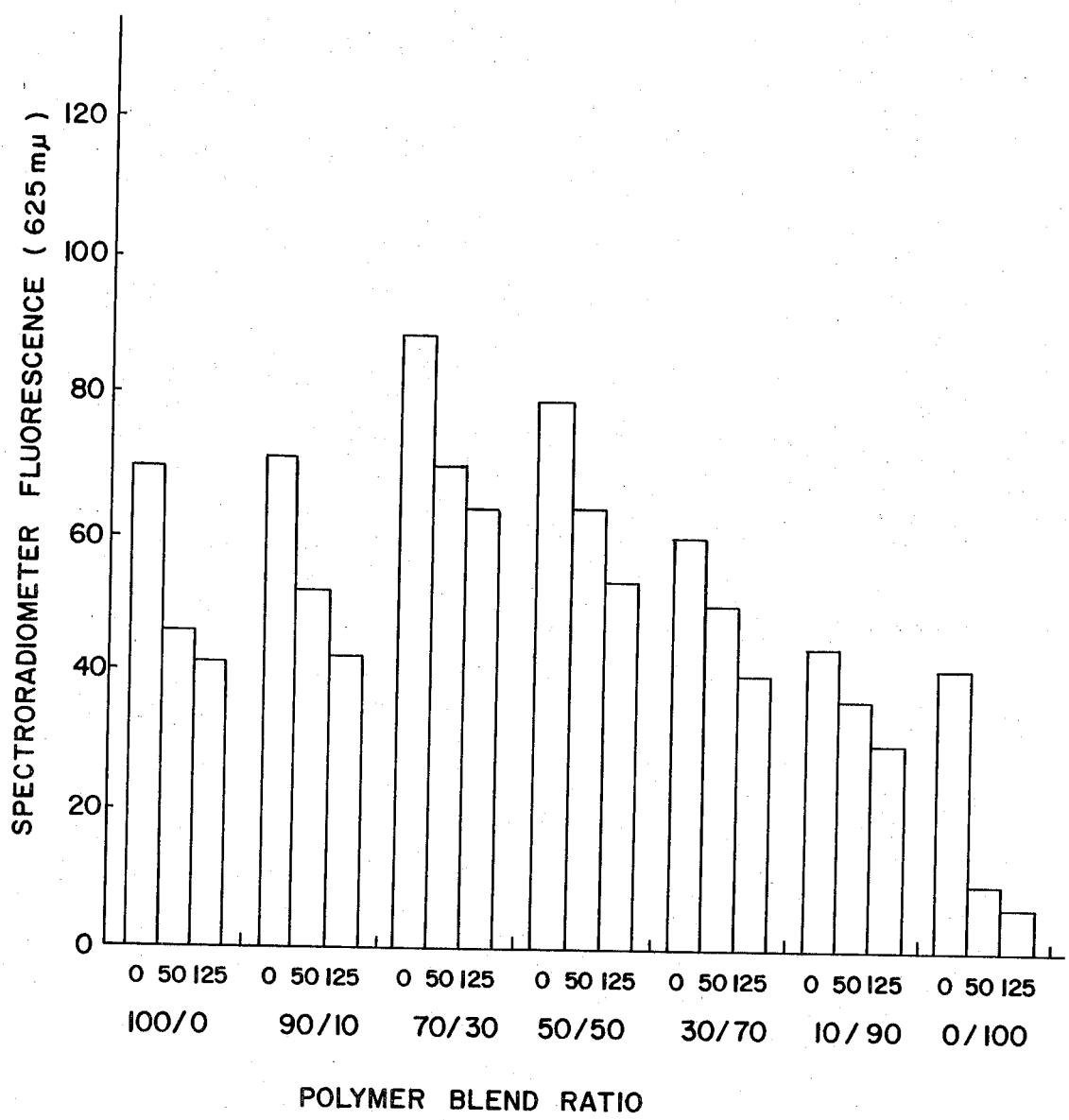
FIG_3

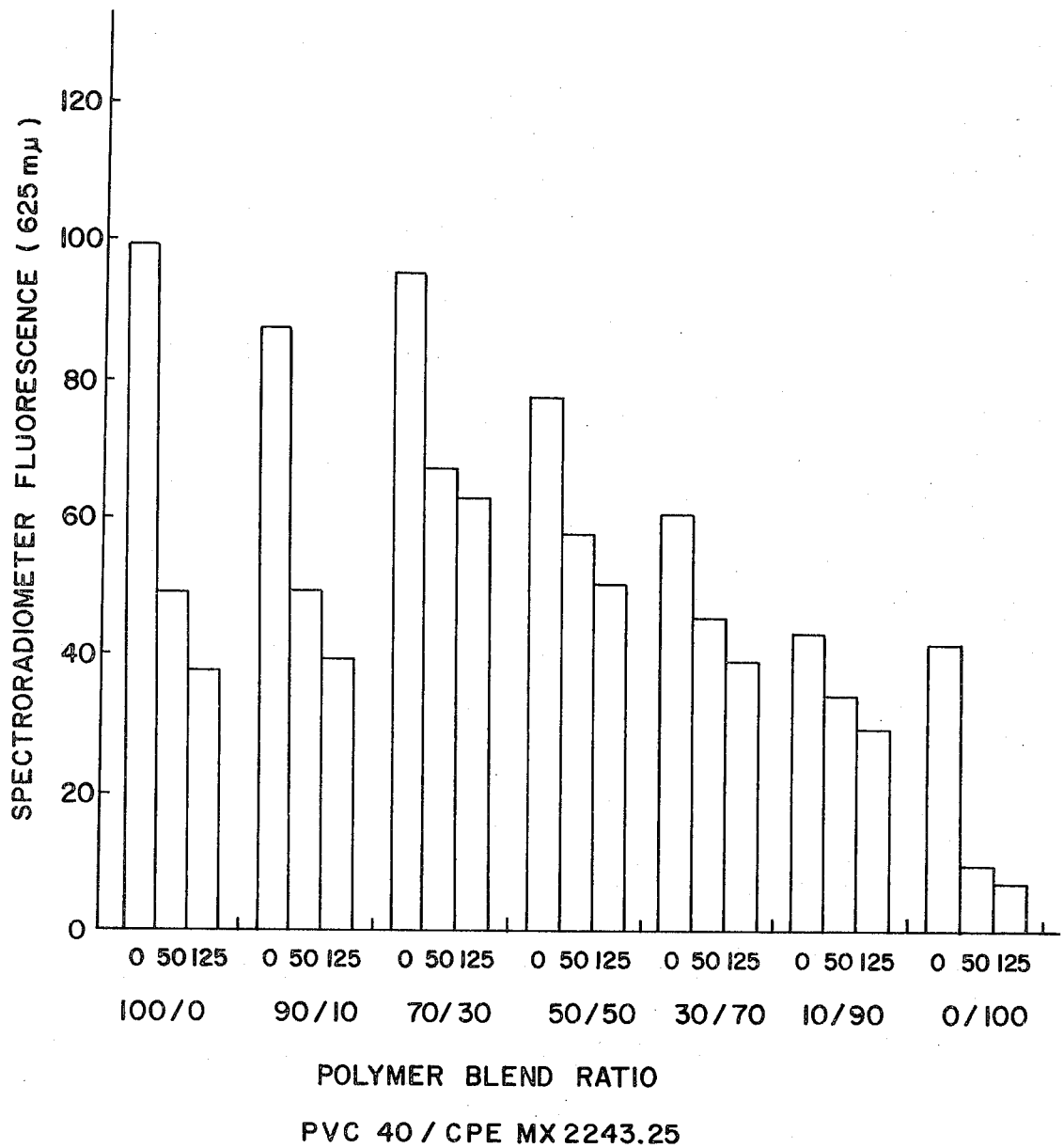

---

3,796,668
FLUORESCENT DYE COLORED PVC
Ralph T. Hickcox, Orinda, Calif., assignor to Hercules, Incorporated, Wilmington, Del.
Continuation-in-part of abandoned application Ser. No. 107,915, Jan. 20, 1971. This application June 14, 1972, Ser. No. 262,916
Int. Cl. C09k 1/02
U.S. Cl. 252—301.2 R                12 Claims

ABSTRACT OF THE DISCLOSURE

Rigid or non-plasticized polyvinyl chloride or copolymers thereof containing an organic fluorescent dye such as a rhodamine dye to impart fluorescent coloration to the resin has improved initial fluorescence and fade resistance upon exposure to light through the incorporation of chlorinated polyethylene, preferably 25–45% by weight of the polyvinyl chloride and chlorinated polyethylene content. Added improvement in these areas is gained through the use of a vinyl stabilizer selected from non-mercaptide organo tin or a chelator with barium-cadmium-zinc or strontium-zinc.

CROSS REFERENCE TO COPENDING APPLICATION

This application is a continuation-in-part of application Ser. No. 107,915, filed Jan. 20, 1971, abandoned concurrently with the filing of this application.

This invention relates to fluorescent colored plastic. More particularly, it relates to polyvinyl chloride and its copolymers containing an organic fluorescent dye for the coloration thereof.

Polyvinyl chloride (PVC) and its copolymers are in common commercial use. A form of this resin which does not contain plasticizers and is referred to as "rigid" PVC is encountered frequently and which may be in a sheet or film form. PVC is used in its clear form but it is often desired to color the resin with a suitable dye or pigment. In the present context, reference is made to PVC having a fluorescent appearance which is imparted by the addition of an organic fluoroescent dye, as distinguished from a pigment, which is dispersed through the PVC resin.

The present invention provides improvements in organic fluorescent dye colored PVC and its copolymers by way of enhanced initial fluorescent appearance of the product and by way of improvements in the resistance of the dye to fading upon exposure to light such as sunlight. In accordance with the present invention it has been discovered that these improvements can be achieved by combining as by blending a sufficient amount of chlorinated polyethylene with the PVC or its copolymers. If desired, additional improvement in fluorescent appearance and fade resistance can be achieved if certain vinyl resin stabilizers are added to the formulation. To this end it has been found that the addition of a non-mercaptide organo tin or a barium-cadmium-zinc or a strontium-zinc stabilizer, the latter two categories of stabilizer preferably being used in combination with a chelator, will provide surprisingly superior results than can be obtained with other types of vinyl resin stabilizer. Various stabilizers are illustrated by fatty acid salts, particularly of from 10 to 20 carbon atoms of tin, barium, cadmium, zinc and strontium. Illustrative fatty acids include laurate, stearate, palmitate, etc. With tin, the stabilizer will have two alkyl substituents, e.g. butyl, and two fatty acid groups, e.g. laurate. See, for example, U.S. Pats. Nos. 2,631,990 and 2,684,973.

The chelators are frequently aryl phosphites, particularly, triaryl phosphites, e.g. triphenyl phosphite.

The chelators are generally used in a weight ratio of about 0.1–1:1 to the stabilizer.

Best results have been obtained where the organic fluorescent dye is a rhodamine dye such as rhodamine B base, although other organic fluorescent dyes and combinations thereof are contemplated. In the preferred embodiment, the improved product is formed in a sheet or film form and the advantages of the invention will be demonstrated in relation thereto in the examples given hereinafter.

The novel and critical aspects of the invention reside in the addition of chlorinated polyethylene and the use of the specified types of vinyl stabilizers. Beyond this the PVC product is processed and formulated in accordance with conventional techniques used with PVC. Thus, the end product will usually contain in addition to PVC, chlorinated polyethylene, and a vinyl stabilizer, a conventional processing resin which aids in the manipulation of the materials in forming the end physical product sought. Also, conventional lubricants may be utilized for their expected benefits as well as ultraviolet screening compounds.

The invention contemplates the use of any polyvinyl chloride homopolymer in any of the variations normally encountered. In addition, copolymers of PVC may be used with similar benefits including such copolymers as PVC/vinyl acetate, PVC/propylene, and PVC/ethylene, where the other monomer may be present in as much as 50 mole percent, usually not more than 25 mole percent.

The chlorinated polyethylene used in combination with the PVC may be any of those materials of this type which are referred to as impact modifiers. The benefits of the invention are obtained by combining an amount of chlorinated polyethylene sufficient to improve the fluorescence and fade resistance of the colored end product. It has been found that the chlorinated polyethylene should constitute about 10–90% by weight of the resin including both the PVC and the chlorinated polyethylene. Best results are obtained where the chlorinated polyethylene constitutes about 20–70% by weight of the resin and most preferably where the chlorinated polyethylene constitutes about 25–45% by weight of the resin. Useful chlorinated polyethylenes may fall in a broad range of materials having differing chlorine content, generally in the range of 20 to 60 weight percent, usually from 30 to 50 weight percent chlorine. Below 20 weight percent compatibility becomes a problem, while with greater than 60 weight percent, determination of flexibility and impact strength is encountered. The chlorinated polyethylene will usually have a melt viscosity in the range of 15 to 30 poises/1000, more usually 16 to 25 poises/1000. Best results have been observed where the polyethylene has a chlorine content of from about 35–40% by weight.

Where a vinyl stabilizer of the specified type is employed, it will generally be included to be an amount of about 1–5% of the weight of the PVC polymer content, preferably about 2–3% by weight. The fluorescent dye will generally be present in an amount of about 0.05–5% by weight of the PVC polymer content and preferably about .2–.3% by weight, although all of these amounts may be varied to some extent depending upon the particular formulation and use of the end product.

To illustrate the invention, a series of experiments were performed using the following materials and procedures. Although the experiments involve a sheet form of product, it will be appreciated that the resins could be used to make articles or parts by casing or molding in conventional fashion. Whatever the physical form of the end product, the same advantages in fluorescence and fade resistance will be obtained.

TABLE I

| Trade name | PVC 40 | Geon 400X47 | Cumberland 470 | QSQH |
|---|---|---|---|---|
| Supplier | Diamond-Shamrock Chemical Co. | B. F. Goodrich Chemical Co. | Air Reduction Company | Union Carbide Co. |
| Type | PVC homopolymer | PVC/vinyl acetate copolymer | PVC/propylene copolymer | PVC/ethylene copolymer. |
| Approx. monomer ratio | 100/0 | 90/10 | 90/10 | |
| Specific gravity | 1.390 | 1.360 | 1.352 | |
| Inherent viscosity ASTM 1243-58T method A (typical values). | .80 | .62 | .60 | |

Impact modifiers:
(1) Acrylic terpolymer (butadiene/styrene/acrylic), acryloid 6721—Rohm & Haas Company, now known as Acryloid KM611
(2) Chlorinated polyethylene, Tyrin QX2243.16—Dow Chemical Company, now known as Dow CPE3614

Processing resin:
(1) Acryloid K120N, poly methyl methacrylate—Rohm & Haas Company Stabilizers:
(1) Organo tin carboxylate—Advastab T150
(2) Tin mercaptide—Advastab T17M, Advance Division, Carlisle Chemical Works, Inc.
(3) Strontium-zinc compound Mark E in combination with a chelating agent, triphenyl phosphite-Mark C, Argus Chemical Division, Witco Chemical Company
(4) Epoxidized soya oil, Paraplex G-62—Rohm & Haas Company Lubricants:
(1) Stearic acid—triple pressed, CP Hall Company
(2) Propylene glycol monostearate technical grade, Nopco Division, Diamond Shamrock
   In combination with oxidized low molecular weight polyethylene—Allied 629A—Allied Chemical Company Ultraviolet screens:
(1) Tinuvin P—Geigy Chemical Company, 2(2-hydroxy-5-methylphenyl) benzotriazole Colorant:
(1) Rhodamine B base—American Cyanamid Company (lot MR 311-14).

MIXING AND SAMPLE PREPARATION

The compounds were weighed in batch sizes totaling approximately 350 grams using methods having accuracy of these significant figures.

The weighed components were placed in polyethylene bags. The open end of the bag was twisted to seal in air to form a spherical balloon permitting rotational shaking agitation to produce a uniformly mixed dry blended compound.

The dry blended compound was then mixed in the nip of a two roll 8" x 16" laboratory mill heated to 330° F.–340° F. and milled for 5 minutes after the compound has fused and banded on the mill roll. The mill roll peripheral speed ratio was 1.16. To guarantee uniform mixing, the stock was continuously cut from one side of the mill to the other and "end rolled" three times on and off the mill. The mill sheets were sheeted off at approximately .040" thickness.

Samples were cut from the mill sheets and pressed for one minute at 350° F. between chromed ferrotype plates to produce polished .004" and .012" thickness.

Test thickness tolerances were .0040"–.0045" and .0120"–.0125". For exposure testing ¾" x 2¾" strips were cross mounted on window type flat aluminum frames (.032" thickness) with open window dimensions 1¾" x 5". The samples were attached to the exposure frames with cloth backed adhesive tape.

EXPOSURE TESTS

The samples were exposed at Desert Sunshine Exposure Tests, 7740 N. 15th Ave., Phoenix, Ariz.

The frames were mounted in the outdoor accelerated weathering unit—EMMA, and returned after 25,000, 50,000, 75,000 and 100,000 langleys exposure.

EMMA, equatorial mount with mirrors for acceleration, is a test exposure unit that moves with the sun and focuses the sunlight onto the test sample by means of special finish aluminum reflecting panels. The reflection amounts of 70–80% of the ultraviolet radiation and 85% of the visible. The radiation impinging on the sample is measured in gram calories per square centimeter (langleys).

EVALUATION OF AGING PROPERTIES

The sample before and after aging are checked in a spectroradiometer for light transmission at 625 m$\mu$ using a mercury vapor light source (Penray lamp).

The characteristics of the light source show no emission peaks at 625 m$\mu$. Therefore, 625 m$\mu$ spectroradiometer readings at this wavelength results from fluorescene-shifted energy from the shorter end of the spectrum.

Hence, the light stability of each compound can be studied by following the decay of fluorescence at 625 m$\mu$.

RESULTS

The results are shown in the following Tables II, III, and IV and which all parts shown are by weight.

TABLE II.—EFFECT OF TYPE OF PVC
.004" test samples

| Sample number | 1 | 2 | 3 | 4 |
|---|---|---|---|---|
| PVC 40 homopolymer | 100.0 | | | |
| Geon 400X47 PVC/acetate | | 100.0 | | |
| Cumberland 470 PVC/propylene | | | 100.0 | |
| QSQH PVC/ethylene | | | | 100.0 |
| Dow QX224316 | 10.0 | 10.0 | 10.0 | 10.0 |
| Acryloid K120N | 5.0 | 5.0 | 5.0 | 5.0 |
| Advastab T150 | 3.0 | 3.0 | 3.0 | 3.0 |
| Paraplex G-62 | 3.0 | 3.0 | 3.0 | 3.0 |
| Stearic acid | 0.5 | 0.05 | 0.5 | (¹) |
| Tinuvin P | 2.0 | 2.0 | 2.0 | 2.0 |
| B base | 0.227 | 0.227 | 0.227 | 0.227 |
| Spectroradiometer readings—Fluorescence decay | | | | |
| Original | 61 | 56 | 59 | 64 |
| After 100,000 langleys (Phoenix exposure) | 46 | 42 | 42 | 47 |
| Percent original | 76 | 75 | 71 | 74 |

¹ Propylene glycol-1.0/Allied 629A-0.5 lubrication monostearate.

*Comment.*—The above results show that the invention is applicable to PVC homopolymer as well as copolymers thereof. The decay of fluorescence each 100M langleys for the homopolymer and each of the copolymers was all on the same order of magnitude.

TABLE III.—EFFECT OF THE IMPACT MODIFIER
.004" test samples

| Sample number | 1 | 2 | 3 | 4 | 5 | 6 |
|---|---|---|---|---|---|---|
| PVC 40 homopolymer | 100.0 | 100.0 | | | | |
| Geon 400X47 PVC/acetate | | | 100.0 | 100.0 | | |
| Cumberland 470 PVC/propylene | | | | | 100.0 | 100.0 |
| Acryloid 6721 | 10.0 | | 10.0 | | 10.0 | |
| Dow QX224316 | | 10.0 | | 10.0 | | 10.0 |
| Acryloid K120N | 5.0 | 5.0 | 5.0 | 5.0 | 5.0 | 5.0 |
| Advastab T150 | 3.0 | 3.0 | 3.0 | 3.0 | 3.0 | 3.0 |
| Paraplex G-62 | 3.0 | 3.0 | 3.0 | 3.0 | 3.0 | 3.0 |
| Stearic acid | 0.5 | 0.5 | 0.5 | 0.5 | 0.5 | 0.5 |
| Tinuvin P | 2.0 | 2.0 | 2.0 | 2.0 | 2.0 | 2.0 |
| Rhodamine B base | 0.227 | 0.227 | 0.227 | 0.227 | 0.227 | 0.227 |
| Spectroradiometer readings—Fluorescence decay | | | | | | |
| Original | 51 | 61 | 49 | 56 | 46 | 59 |
| After 100,000 langleys (Phoenix exposure) | 15 | 46 | 17 | 42 | 16 | 42 |
| Percent original | 29 | 76 | 35 | 75 | 35 | 71 |

*Comment.*—The above results show that formulations containing chlorinated polyethylene show consistent superiority over formulations containing other types of impact modifiers such as an acrylic with respect to initial fluorescence and color retention. In each of the above systems containing chlorinated polyethylene the spectroradiometer readings were substantially initially higher and maintained 36–47% more fluorescence after 100M langleys exposure as compared with the formulations containing the acrylic modified formulations.

MIXING PROCEDURE

Masterbatches of the base compounds were made using 100% PVC 40 and the two 100% chlorinated polyethylene polymers with the two stabilization systems each, making a total of six masterbatches.

The masterbatches were mixed five minutes at 330–340° F. on a two roll mill, sheeted off and cooled.

Blends of the masterbatches were then milled together in the proper proportion for three minutes and sheeted off for lab pressing.

EXPOSURE OF SAMPLES

The milled compounds were pressed between ferrotype plates to 4 mils (.004") and mounted in exposure frames as described in the preceding experiments. Spectroradiometer readings before and after exposure were taken and the results plotted on bar graphs showing the decay of fluoroescence of the various blends as follows:

FIG. 1 represents a blend of Diamond-Shamrock Chemical Company's PVC 40 and Dow Chemical Company's chlorinated polyethylene CPE3614. The percentage by weight of chlorine in this polymer is 36% by weight. The formulation represented by results in FIG. 1 utilized Advastab T150 (tin carboxylate) vinyl stabilizer.

FIG. 2 utilizes the same formulation as used in obtaining the data for FIG. 1 except that the vinyl stabilizer was Mark E/C (strontium-zinc).

TABLE IV.—EFFECT OF TYPE OF STABILIZER
.004" test samples

| Sample number | 1 | 2 | 3 | 4 | 5 | 6 | 7 | 8 | 9 |
|---|---|---|---|---|---|---|---|---|---|
| PVC 40 homopolymer | 100.0 | 100.0 | 100.0 | | | | | | |
| Geon 400X47 PVC/acetate | | | | 100.0 | 100.0 | 100.0 | | | |
| Cumberland 470 PVC/propylene | | | | | | | 100.0 | 100.0 | 100.0 |
| Dow QX2243.16 | 10.0 | 10.0 | 10.0 | 10.0 | 10.0 | 10.0 | 10.0 | 10.0 | 10.0 |
| Acryloid K120N | 5.0 | 5.0 | 5.0 | 5.0 | 5.0 | 5.0 | 5.0 | 5.0 | 5.0 |
| Paraplex G-62 | 3.0 | 3.0 | 3.0 | 3.0 | 3.0 | 3.0 | 3.0 | 3.0 | 3.0 |
| Stearic acid | 0.5 | 0.5 | 0.5 | 0.5 | 0.5 | 0.5 | 0.5 | 0.5 | 0.5 |
| Tinuvin P | 2.0 | 2.0 | 2.0 | 2.0 | 2.0 | 2.0 | 2.0 | 2.0 | 2.0 |
| B base | 0.227 | 0.227 | 0.227 | 0.227 | 0.227 | 0.227 | 0.227 | 0.227 | 0.227 |
| Advastab T17M (tin mercaptide) | 2.0 | | | 2.0 | | | 2.0 | | |
| Mark L/Mark C strontium zinc/chelator | | 3/1 | | | 3/1 | | | 3/1 | |
| Advastab T150 tin carboxylate | | | 3.0 | | | 3.0 | | | 3.0 |
| Spectroradiometer readings—Fluorescence decay | | | | | | | | | |
| Original | 45 | 72 | 61 | 51 | 69 | 56 | 54 | 73 | 59 |
| After 100M langleys (Phoenix exposure) | 14 | 47 | 46 | 43 | 43 | 42 | 33 | 40 | 42 |
| Percent original | 31 | 65 | 76 | 67 | 63 | 75 | 61 | 55 | 71 |

*Comment.*—The above results show the uniqueness of vinyl stabilizers contemplated by this invention. The sulfur containing tin mercaptide stabilizer performed consistently more poorly than strontium zinc/chelator or tin carboxylic compounds with respect to fluorescence after exposure.

The following experimental work is designed to show the effect of the concentration of chlorinated polyethylene in the formulation as well as the effect of the percentage by weight of chlorine in the chlorinated polyethylene polymer. The results are illustrated in FIGS. 1–4 of the accompanying drawings. The results shown in FIGS. 1–4 were attained with the following formulation:

|  | Parts by weight |
|---|---|
| PVC 40 | 100—X |
| Chlorinated polyethylene | X |
| Advastab T150 | 3.0 |
| Acryloid K120N | 5.0 | or

|  | Parts by weight |
|---|---|
| Mark E/C | 3.0/1.0 |
| Paraplex G-62 | 5.0 |
| Polyethylene glycol monostearate | 1.0 |
| Low M.W. polyethylene, AC629A | 0.5 |
| Tinuvin P | 2.0 |
| Rhodamine B base (MR961-1) | 0.227 |

FIG. 3 was obtained from a formulation using a polymer blend of Diamond-Shamrock Chemical Company's PVC 40 with Dow Chemical Company's chlorinated polyethylene CPE2243.25 which has a chlorine content of 48% by weight. The vinyl stabilizer was Advastab T150 (tin carboxylate).

FIG. 4 utilized the same polyethylene mixture as in FIG. 3, the only difference being the use of Mark E/C strontium-zinc (vinyl stabilizer) instead of Advastab T150.

In accordance with this invention, fluorescent colored non-plasticized polyvinyl chloride or vinyl chloride copolymers are provided having enhanced fluoroescence and fade resistance. The fluorescent dye polymeric material has as an additive chlorinated polyethylene and a stabilizer which is sulfur free. The resulting product is found to retain its bright fluorescent properties for long periods of time.

Although the foregoing invention has been described in some detail by way of illustration and example for purposes of clarity of understanding, it will be obvious that certain changes and modifications may be practiced within the scope of the appended claims.

What is claimed is:

1. A fluorescent colored plastic composition which gives articles of enhanced fluorescence and fade resistance comprising (a) a blend of (1) 10–90% by weight of rigid homopolymer of vinyl chloride or a copolymer of vinyl chloride with up to 50 mole percent of vinyl acetate, ethylene or propylene and (2) from 90 to 10% by weight of the blend respectively of chlorinated polyethylene containing from 20 to 60 weight percent chlorine, (b) a coloring amount of a rhodamine dye and (c) a stabilizing amount of at least one fatty acid salt of Sn, Ba, Cd, Zn or Sr or the combination of at least one of said fatty acid salts and a triaryl phosphite chelating agent.

2. A composition according to claim 1, wherein said chlorinated polyethylene is present in from about 20 to 70 weight percent of the blend and has a chlorine content of from about 30 to 50 weight percent.

3. The composition of claim 1, wherein (1) is rigid poly(vinyl chloride) and said rhodamine dye is rhodamine B base.

4. An article of the composition of claim 1.

5. An article according to claim 4 wherein said rhodamine dye is rhodamine B base.

6. An article according to claim 5, wherein said chlorinated polyethylene contains from 30 to 50 weight percent chlorine.

7. An article according to claim 1 wherein (c) is a dialkyl tin dicarboxylate derived from a fatty acid containing from 10 to 20 carbon atoms.

8. An article according to claim 6, wherein said dye is present in an amount ranging from about 0.05 to 0.5% by weight of (1).

9. An article according to claim 6, wherein (c) is a strontium-zinc fatty acid salt in combination with triphenyl phosphite.

10. An article according to claim 4 which has been cast, molded or formed as a sheet.

11. A fluorescent colored plastic composition which gives articles of enhanced fluorescence and fade resistance comprising (a) a blend of (1) about 90 parts of a rigid homopolymer of vinyl chloride or a copolymer of vinyl chloride with up to 50 mole percent of vinyl acetate, ethylene or propylene and (2) about 10 parts of chlorinated polyethylene containing from 35 to 40 weight percent chlorine, (b) from 1 to 5% by weight of (1) of an organotin carboxylate resin stabilizer and (c) from 0.2 to 0.3% by weight of (1) of a rhodamine dye.

12. A fluorescent colored plastic composition which gives articles of enhanced fluorescence and fade resistance comprising (a) a blend of (1) about 90 parts of a rigid homopolymer of vinyl chloride or a copolymer of vinyl chloride with up to 50 mole percent of vinyl acetate, ethylene or propylene and (2) about 10 parts of chlorinated polyethylene containing from 35 to 40 weight percent chlorine, (b) from 1 to 5% by weight of (1) of a barium-cadmium-zinc or strontium-zinc carboxylate stabilizer chelated with triphenyl phosphite and (c) from 0.2 to 0.3% by weight of (1) of a rhodamine dye.

References Cited

UNITED STATES PATENTS

| | | | |
|---|---|---|---|
| 2,382,355 | 8/1945 | Warren | 252—301.2 R |
| 2,386,855 | 10/1945 | Horback | 252—301.2 R |
| 2,940,937 | 6/1960 | O'Brien | 252—301.2 R |
| 3,022,189 | 2/1962 | Malmquist | 252—301.3 R |
| 3,125,536 | 3/1964 | O'Brien | 252—301.3 R |

OTHER REFERENCES

O'Toole et al.: Modern Plastics, 41(7), March 1964, pp. 149–152, 210.

DANIEL E. WYMAN, Primary Examiner

A. P. DEMERS, Assistant Examiner

U.S. Cl. X.R.

252—301.3 R; 260—45.75 R, 45.75 K

UNITED STATES PATENT OFFICE
CERTIFICATE OF CORRECTION

Patent No. 3,796,668          Dated  March 12, 1974

Inventor(s)  Ralph T. Hickcox

It is certified that error appears in the above-identified patent and that said Letters Patent are hereby corrected as shown below:

Column 2, line 60, "0.05-5%" should read -- 0.05-.5% --.
Column 4, line 58, "0.05" should read -- 0.5 --. Columns 5 and 6, next to last line of Table IV, Sample 4, "43" should read -- 3 --.

Signed and sealed this 10th day of September 1974.

[SEAL]
Attest:

McCOY M. GIBSON, JR.
Attesting Officer

C. MARSHALL DANN
Commissioner of Patents